United States Patent
Sum et al.

(10) Patent No.: US 9,448,393 B2
(45) Date of Patent: Sep. 20, 2016

(54) METHOD AND APPARATUS FOR AUTOMATED SCANNING PROBE MICROSCOPY

(71) Applicant: Nuomedis AG, Liestal (CH)

(72) Inventors: Robert Sum, Liestal (CH); Lukas Emanuel Howald, Dornach (CH); Urs Matter, Solothurn (CH)

(73) Assignee: NUOMEDIS AG, Liestal (CH)

( * ) Notice: Subject to any disclaimer, the term of this patent is extended or adjusted under 35 U.S.C. 154(b) by 0 days.

(21) Appl. No.: 14/629,817

(22) Filed: Feb. 24, 2015

(65) Prior Publication Data

US 2015/0241468 A1 Aug. 27, 2015

(30) Foreign Application Priority Data

Feb. 26, 2014 (EP) ..................... 14405017

(51) Int. Cl.
*G02B 21/00* (2006.01)
*G01B 9/00* (2006.01)
(Continued)

(52) U.S. Cl.
CPC ....... *G02B 21/0028* (2013.01); *G01B 9/02091* (2013.01); *G01Q 30/02* (2013.01); *G01Q 30/04* (2013.01); *G06K 9/00134* (2013.01); *B82Y 35/00* (2013.01)

(58) Field of Classification Search
CPC ...... B82Y 35/00; G01Q 10/00; G01Q 10/02; G01Q 10/04; G01Q 10/045; G01Q 10/06; G01Q 10/065; G01Q 20/00; G01Q 20/02; G01Q 20/04; G01Q 30/02; G01Q 30/04; G01Q 60/24; G02B 21/0028; G01B 9/02091
See application file for complete search history.

(56) References Cited

U.S. PATENT DOCUMENTS

| | | | |
|---|---|---|---|
| 6,339,217 B1 * | 1/2002 | Kley | B82Y 20/00 250/216 |
| 7,810,166 B2 | 10/2010 | Struckmeier et al. | |
| 8,024,816 B2 | 9/2011 | Iyoki et al. | |
| 8,454,512 B2 | 6/2013 | Wang et al. | |

(Continued)

FOREIGN PATENT DOCUMENTS

| DE | 2437027 A2 * | 4/2012 | .......... G01B 11/2518 |
|---|---|---|---|
| EP | 2437027 A2 | 4/2012 | |

OTHER PUBLICATIONS

European Search Report for corresponding European Application No. EP 14405017.6 mailed Apr. 7, 2014.

(Continued)

*Primary Examiner* — Nicole Ippolito
*Assistant Examiner* — David E Smith
(74) *Attorney, Agent, or Firm* — Renner, Otto, Boisselle & Sklar, LLP

(57) ABSTRACT

This invention concerns scanning probe microscopes and related instruments ("SPMs") when used to investigate or measure large samples whose size is a multiple of the typical operational scanning area of an SPM, say 150 μm×150 μm at most. To avoid frequent readjustments or other time-consuming human interaction and errors when focusing the SPM, a multi-step, automated method for the SPM-scanning of large samples is disclosed, comprising a "coarse", i.e. low resolution, non-SPM scanning or mapping step adapted to scan a large sample and providing an integral map of the sample, followed by a preferably mathematical evaluation step identifying areas of interest of the sample, which areas are then subjected to a focused "fine" raster scanning step by the SPM with high resolution. The associated apparatus provides the means to execute this novel three-step process.

14 Claims, 4 Drawing Sheets

(51) Int. Cl.
*G01Q 30/02* (2010.01)
*G01B 9/02* (2006.01)
*G01Q 30/04* (2010.01)
*G06K 9/00* (2006.01)
*B82Y 35/00* (2011.01)

(56) References Cited

U.S. PATENT DOCUMENTS

| | | | | |
|---|---|---|---|---|
| 8,595,859 B1* | 11/2013 | Rankl | ............... | B82Y 35/00 73/105 |
| 2008/0135750 A1* | 6/2008 | Kley | ............... | B82Y 35/00 250/306 |
| 2010/0268042 A1* | 10/2010 | Wang | ............... | A61B 5/0059 600/322 |
| 2013/0271757 A1* | 10/2013 | Kang | ............... | A61B 3/102 356/300 |

OTHER PUBLICATIONS

Huang et al., Optical coherence tomography, Science 254, 1178-1181 (1991).
Hao F. Zhang et al., "Functional photoacoustic microscopy for high-resolution and noninvasive in vivo imaging", Nature Biotechnology, vol. 24, No. 7, Jul. 1, 2006, pp. 848-851, XP055042264.
M.G.L. Gustafsson et al., "Three-dimensional resolution doubling in wide-field fluorescence microscopy by structured illumination", Biophys. Journal, 94, 4957-4970 (Jun. 2008).
Plodinec et al., "The nanomechanical signature of breast cancer", Nature Nanotechnology 7 (2012), pp. 757,765.
OriginPro 8.5, OriginLab Corporation, 2010.

* cited by examiner

METHOD AND APPARATUS FOR AUTOMATED SCANNING PROBE MICROSCOPY

TECHNICAL FIELD OF THE INVENTION

The present invention concerns scanning probe microscopes and other nanoscale cantilever-based or micromechanical instruments (here generally termed "SPMs") and is directed to an improvement for investigating or measuring large areas or surfaces of two-dimensional or three-dimensional objects. Since the operational range of SPMs is very small, typically in the range of μm, the scanning of large areas is often a time-consuming task. Especially when scanning uneven, rough surfaces or large three-dimensional samples, frequent readjustments of the SPM are necessary which does not only require trained personnel for its execution, but also needs more time than may be available. Thinking e.g. of a medical or biological application, time can be of truly vital importance.

The present invention provides a solution to this problem by a novel approach in form of a multi-step, automated method for the SPM-scanning of large samples. This novel approach limits human interaction and thus minimizes or even excludes human errors, providing fast and practically error-free results.

BACKGROUND AND PRIOR ART

Today, scanning probe microscopy as other micromechanical cantilever applications (generally termed "SPM applications" in the following) have become standards in fields extending from laboratory tests to industrial applications in batch production lines and medical applications in hospitals. Thus, samples to be investigated may be tiny, isolated particles or living cells, typically in the μm range, as well as relatively large samples like structures and surfaces of industrial products or tissue probes in medical applications, often measured in cm in size.

Considering the extremely small range of operation of SPMs, both in the z-axis, i.e. the "altitude" dimension, as well as in the x/y-dimension, i.e. the scannable area, it is obvious that multiple readjustments are required when scanning large, uneven, or three-dimensional objects.

To give examples of actual sizes, an area scannable by a typical SPM may have a size of 10 μm×10 μm to 150 μm×150 μm at most and the operational range along the z-axis is often no more than a few μm, e.g. 5 μm. Completely scanning an object of e.g. 1 mm diameter width and 10 mm length is thus obviously a lengthy task, taking altogether between 1'000 and 100'000 scans, each scan requiring a readjustment of the sample. Considering that it is often sufficient to scan only certain significant or critical parts or areas of an object, it becomes apparent that a possibly automated method for selecting those significant areas would be very advantageous.

The present invention provides this solution. It is a multi-step process. In a first step, the complete surface of an object or a large part of it is mapped in its entirety, not by SPM scanning, but by a "coarse" method, e.g. by optical means, developing an integral map of the object, preferably in digital form. In a second step, the thus produced integral map is subjected to a, preferably mathematical, analysis to identify and localize areas or spots of interest or significance, thus providing a map or listing of test areas or locations. These areas are e.g. for SPM flat areas which are accessible with a SPM probe, e.g. a cantilever with integrated tip. In a third step, these test areas or locations are "fine" scanned by the SPM. The results of this SPM scanning can be displayed, stored, printed, or subjected to a further analysis. The latter could be a fourth step of the method according to the invention.

All above steps are automated so that human interaction with the system is limited to the insertion of the probe or sample and the reading of the results, or the use of a printout, or the use of the results of the further processing, resp. human errors or misinterpretations are thus practically excluded.

It is usual practice in scanning probe microscopy, as in other micromechanical cantilever applications, to bring the sensing probe close to the surface of the sample by a multiple step process, e.g. with a coarse approach mechanism and a fine adjustment by the z-actuator used for scanning the probe. The sensing probe consists in case of SPM usually of a cantilever with integrated sharp tip at its end. This approach step is finished when a criterion such as defined cantilever deflection or, in case of an oscillating cantilever, a predefined oscillation amplitude or frequency change is detected. To prevent, during the approach step, the sharp end or tip of the probe from damage by touching the sample surface, elaborate detection mechanisms have been developed, described e.g. in Iyoki et al. U.S. Pat. No. 8,024,816 B2. However, all these procedures are time consuming.

In order to reduce the time consumption of the approach step(s), various rather complex procedures to automatize a scanning probe microscope have been pursued, e.g. described in Struckmeier et al. U.S. Pat. No. 7,810,166 B2. Therein, the main problems addressed are the optimizing of scan parameters and the subsequent processing of measurements using predefined parameter sets.

All efforts so far do not provide an automated method or device for a pre-evaluation of any measurements and automated search for optimized measurement conditions or preferable measurement positions, i.e. positions which promise high yield of good quality results.

On the other hand, and in a totally different technological field, i.e. not related to raster scanning microscopy, there are relatively coarse methods—as compared to SPM methods—for the optical mapping of much larger samples than usually scanned with SPMs.

One example of a—in relation to scanning probe microscopy—"coarse" optical scanning methods is disclosed in Schwertner EP 2 437 027. The disclosed three-dimensional scanning method uses structured illumination of a sample and has the advantage that large samples can be scanned rather quickly, even samples that are larger than the optical field of view. This is done by relative movement between the sample plane and sample. It involves providing rectilinear relative movement between a sample plane and a sample which plane is inclined with respect to direction of the relative movement. Then the surface configuration of the sample is reconstructed from a set of calculated optical section images.

Another example for such coarse optical scanning methods discloses Wang et al. U.S. Pat. No. 8,454,512, showing a confocal photoacoustic microscopy system. It includes a laser which focuses a light pulse onto an area inside of an object and an ultrasonic transducer receiving acoustic waves emitted by the object in response to the light pulse. An electronic system processes the acoustic waves and generates an image of the area. The focal point of the laser preferably coincides with the focal point of the ultrasonic transducer.

However, none of these coarse optical scanning methods provides a resolution of the obtained data that is comparable to the resolution obtainable with an SPM. Further, none of them is in any way suited for or adapted to an SPM. First, the method of raster scanning differs fundamentally from optical surface investigation methods. Second, the obtained data of the two methods are incompatible. Third, optical scanning apparatuses are so different from raster scanning devices that it requires inventive effort to adapt one to the other.

THE INVENTION

As already indicated above, it is the main object of the invention to create an automated method and apparatus for operating an SPM or other cantilever-based instrument, in order to overcome the fundamental "small-area" shortcoming of SPM systems.

It is a further object to reduce or avoid human interaction, e.g. readjustment, when operating an SPM or other cantilever-based instrument when measurements or tests of large, or uneven, or three-dimensional samples or objects are carried out.

It is a still further object to speed up the SPM-processing of such large, or uneven, or three-dimensional samples or objects and to obtain results practically "on the run".

Another object is to detect an area of interest, e.g. on a tissue, by analyzing specific information obtained in the first step, e.g. obtained optical spectral information, to increase throughput and thus decrease time for measurement.

A still further object is to use spectral depth information from, e.g. optical, measurements, to obtain qualitative information of the material of interest, e.g. tissue, which is to be measured.

The invention is a method to automate the SPM measurement which meets these and further objects as follows. In brief, the inventive method and the associated apparatus combine, in a novel automatic three-step process. A "coarse" scanning or mapping step adapted to scan a large sample or object, e.g. an optical or acoustical or opto-acoustical scanning method, results in a map of the sample. Then follows as second step a mathematical evaluation of the map data obtained. This evaluation identifies selected areas of the sample, i.e. "areas of interest". These areas are then, in a third step, subjected to a "fine" scanning step of by orders of magnitude higher resolution, namely a raster scanning method. This novel process is automated, i.e. it requires no human interaction during the measurement. Automated in particular is the transition between the coarse mapping step and the fine raster scanning step, including the selection of areas on the sample requiring a fine scan. The associated apparatus provides the means to execute this novel three-step process in an inventive way.

The means used for the raster scanning step is a scanning probe microscope (SPM), which may use any of the following methods: topography imaging, force distance spectroscopy, indentation spectroscopy, friction force spectroscopy, magnetic force spectroscopy, capacitance spectroscopy, force modulation spectroscopy, bias spectroscopy, tunneling spectroscopy or friction force microscopy.

The advantages of the invention are obvious. Heretofore, the raster scanning of large samples, i.e. samples of more than a few square µm was a cumbersome and time-consuming process. As mentioned above, investigating a relatively small sample of just a few square mm needed many hours, requiring much human interaction by readjustments and restarts of the SPM. Using the invention, the whole process runs not only automatically, but it produces a conclusive and clear result within a much shorter time than before.

Details of the invention will be discussed and explained in the following description of the process and several apparatuses in particular. Other details can be taken from the appended claims.

DESCRIPTION OF SEVERAL EMBODIMENTS

Below, the invention is described by means of several embodiments in conjunction with the drawings. Further features or additional characteristics of the invention may be realized either individually or as combinations of different embodiments of the invention. In the drawings FIG. 1 is a schematic overall view of a first system according to the invention, using an optical device for producing an integral map of a sample;

Figure 1:
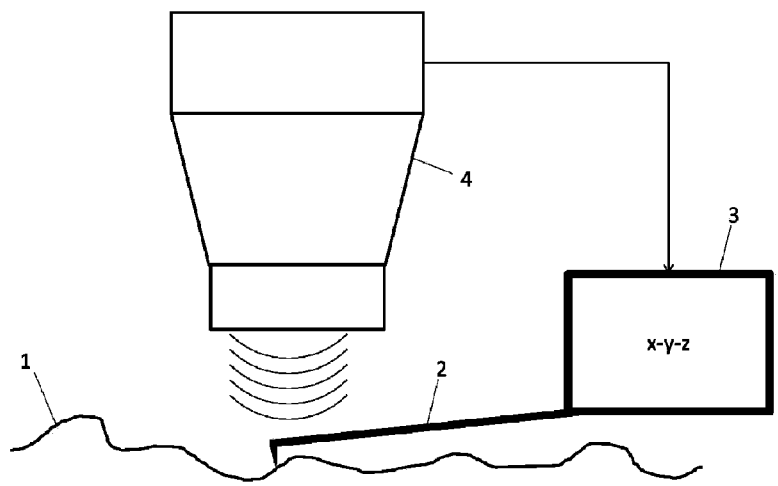

FIG. 1 shows the general layout of a first system according to the invention. A sample 1 whose surface is to be scanned by the cantilever 2 driven by an SPM 3, (which can be, as mentioned above, a scanning probe microscope or other nanoscale, cantilever-based or micromechanical instrument) is located close to a pre-evaluation device 4. The latter is able to scan the sample completely, or at least a large area of it, in 2 or 3 dimensions. It may be an optical system or an ultrasonic system or any other system capable of scanning or evaluating a surface whose dimensions are by several orders of magnitude larger than the field scannable by an SPM. An example is a 10 mm×10 mm field of view of the pre-evaluation device and a 100 µm×100 µm scanning area of the SPM.

The pre-evaluation device or PED 4 produces an "integral or overall map" of the whole sample or of a large part of it. If the PED is a suitable optical device as shown in FIG. 1, it can e.g. produce a map by using optical coherence tomography of the sample's surface as described by Huang et al. in "Optical coherence tomography", published in Science 254, 1178-1181 (1991).

Figure 2:
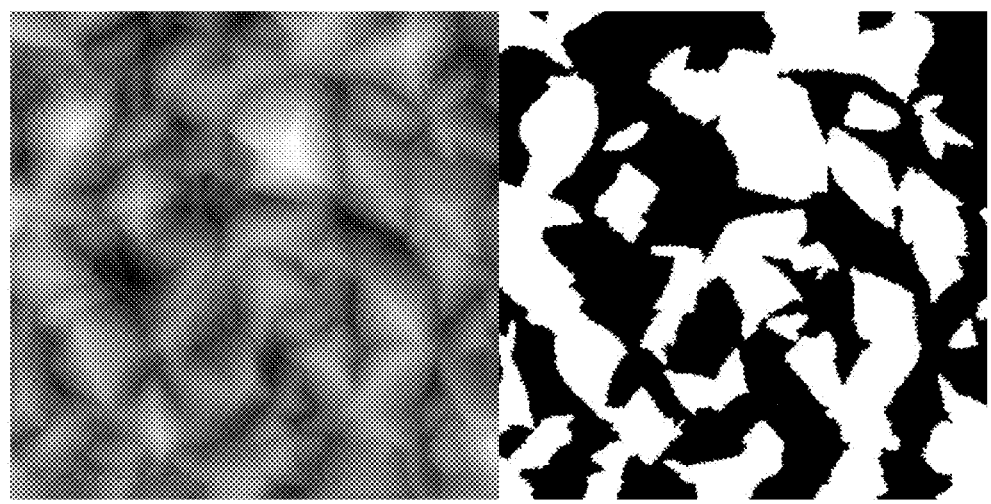
FIG. 2 illustrates on the left side a map of a sample surface produced by optical coherence tomography.

FIG. 2 shows on the left side such a map produced by optical coherence tomography of a sample's surface. A low coherent light source illuminates the sample. The reflected light from the sample is interfering with a reference beam resulting in an interferometric signal. The distance between sample and light source is varied (or modulated) and the resulting (distance dependent) interference patterns are subsequently or real-time processed to obtain 3-D information of the surface.

As shown in FIG. 1, the PED (Pre-Evaluation Device) 4 is connected to the SPM 3, controlling the latter with regard to its field to be scanned. The coarse approach mechanism of the SPM serves simultaneously as distance modulator for the PED device and subsequently the PED 4 serves as coarse approach mechanism for the SPM, directing the SPM 3 to the "interesting" or "validated" areas or points of the sample, i.e. the areas/points of interest to be further investigated.

In the present embodiment, this works in the following way. The data from the PED 4 is processed by a mathematical collision detection method to define the locations to be investigated by the SPM. These locations can be single points or coherent areas of the sample. FIG. 2 shows in the left picture an example of a greyscale representation of an image acquired with the PED 4.

This representation, here a greyscale representation, is then subjected to a preferably mathematical evaluation which results in a map or image identifying areas or points of interest that should be investigated in detail, i.e. to be fine scanned by the SPM. The evaluation can be carried out by or within the PED 4 or, alternatively, by an external computer (not shown) connected to the PED.

The image resulting from the evaluation is shown in the right picture of FIG. 2. Therein, the black areas are not accessible or not of interest, resp., whereas the white areas are "validated" as areas of interest. In these white areas, SPM measurements such as imaging, force vs. distance spectroscopy, friction force measurements, or nanoindentation measurements are then performed. This is done by positioning the cantilever 2 in or close to each of the validated areas either by the integrated scanner of the SPM or by a positioning table supporting the sample. The latter is connected to the system and automatically moves the sample such that the validated area can be accessed by the SPM device.

The mathematical method mentioned above "checks" whether the minimal vertical distance from sample to cantilever of the SPM is at the measuring tip's position—otherwise parts of the cantilever may touch the samples' surface. To avoid the latter under all circumstances is one of the main objects of this invention.

One of the biggest challenges when measuring large and uneven surfaces is the unintended collision of a part of the SPM device other than the measuring tip. If a part of the SPM other than the measuring tip collides with the sample, the sample may get damaged or altered, which in turn falsifies the whole measurement. Or, if a part of the cantilever other than its tip collides with the sample, the SPM records a measurement, but this is erroneous, leading to wrong data and to apparent "artifacts" in the measurement. These artifacts are typical phenomena occurring during SPM measurements. An experienced user easily detects them by observation, but in a fully automated system such events must be totally excluded to obtain reliable and error free results.

Figure 3:
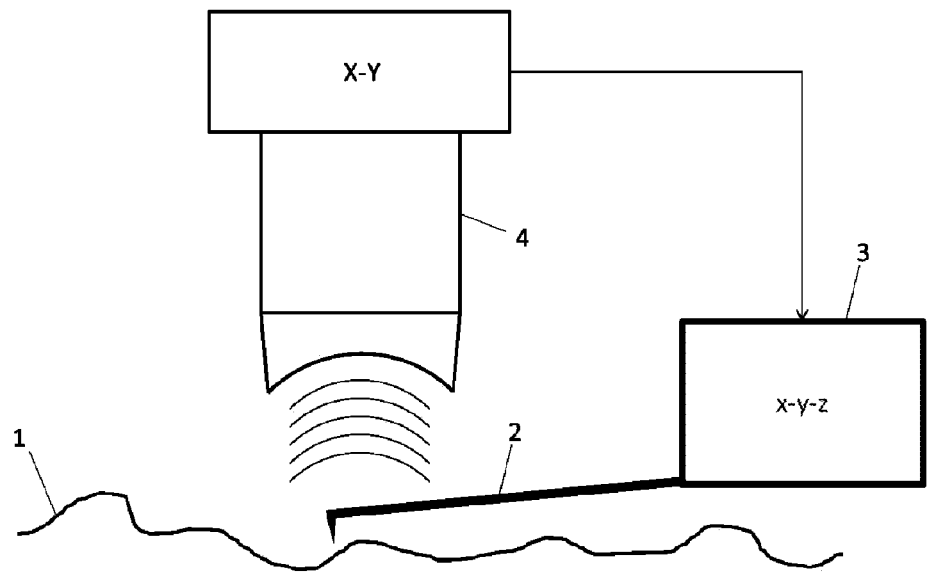
FIG. 3 shows an schematic view of a second system according to the invention, using a scanning ultrasonic system for producing an integral map of the sample surface.

FIG. 3 shows a second embodiment wherein the PED 14 is a photo-acoustic system whose principle is described by Zhang et al. in Nature Biotechnology 24, No. 7, 848-851 (July 2006): "Functional photoacoustic microscopy for high-resolution and noninvasive in vivo imaging". In this system, a laser-emitted light pulse is focused onto an object area of a sample and generates photo-acoustic ultrasonic waves. The magnitude of these acoustic waves indicates the distribution of optical energy in the sample. The acoustic waves emitted by the sample are received by an ultrasonic transducer which is scanned in x-y direction across the surface and whose output is processed electronically to generate a digital image of the object area, i.e. an overall or integral map.

The digital data thus generated by the PED 4 are processed in the same manner as described above to define the areas of interest of the sample. These locations can be single points or coherent areas. The SPM probe is then placed coarsely in a positioning x-y-step and thereafter performs the desired fine scanning. The latter can be topography imaging, force distance spectroscopy, friction force microscopy, nanoindentation spectroscopy or any other SPM method as mentioned above.

Figure 4:
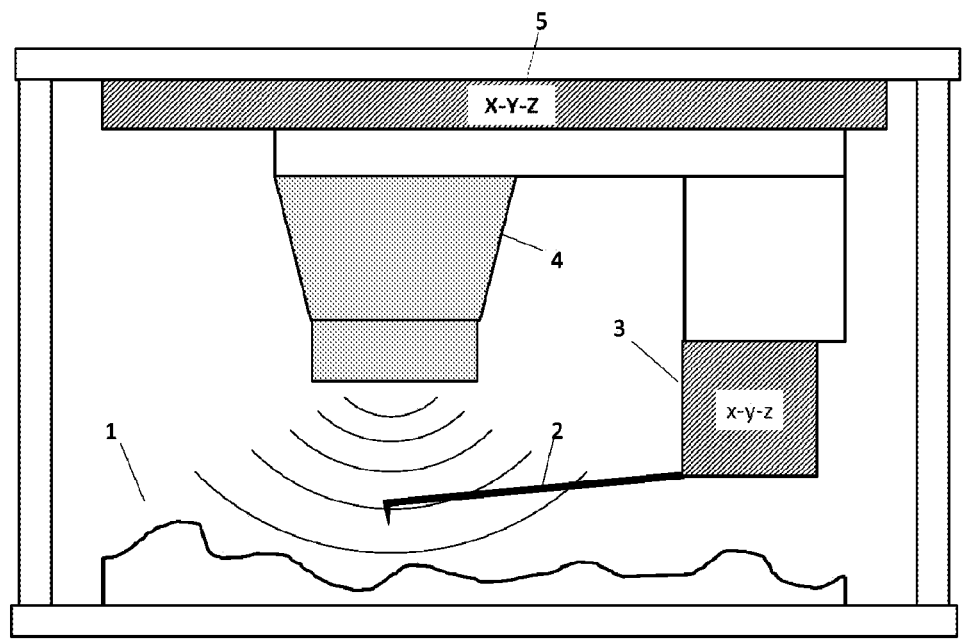
FIG. 4 depicts an overall view of a third system according to the invention, using optical mapping where the coarse approach mechanism is used for achieving an integral map of the surface.
Figure 5:
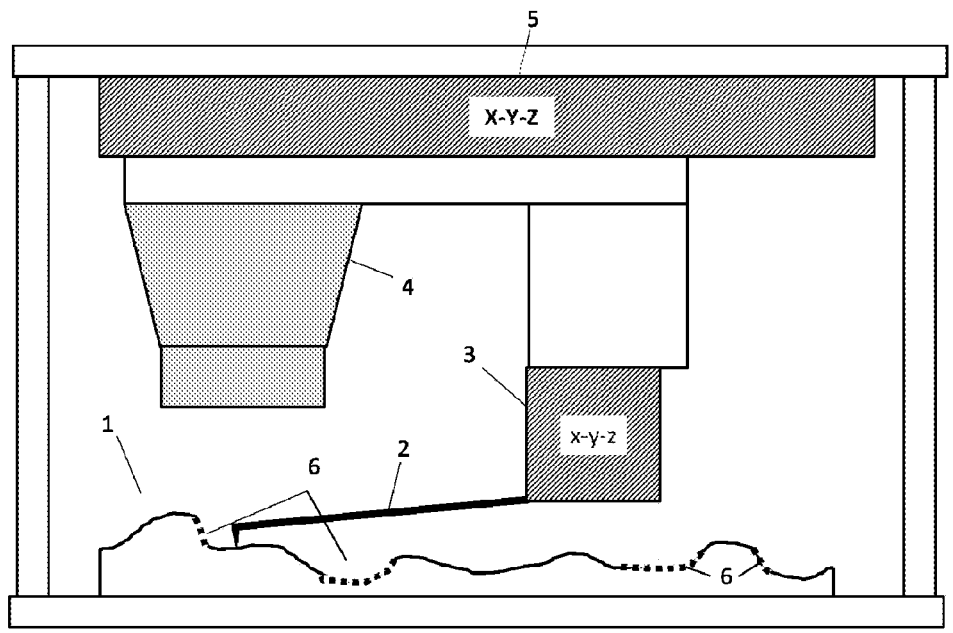
FIG. 5 is an overall view of the third system according to the invention with positioned scanning means, showing inaccessible areas of the sample.

FIGS. 4 and 5 show a third embodiment where the overall map is obtained by an integrated PED-SPM, i.e. a combined mechanical and/or electronical device including the coarse approach system or PED 4 with its drive system 5 and the SPM 3. The PED here being used as part of the integral PED-SPM uses an optical mapping as described by, e.g., M. G. L. Gustafsson et al. in Biophys. Journal, 94, 4957-4970 (June 2008): "Three-dimensional resolution doubling in wide-field fluorescence microscopy by structured illumination".

The method performed by the PED 4 is a three-dimensional scanning method using structured illumination of a sample. It has the advantage that large samples can be investigated rather quickly. Even samples that are larger than the optical field of view of the PED can be quickly scanned by relative movement between the sample and the PED. The details of this first step according to the invention are as follows.

The measurement is initiated by placing the sample 1 into the embodiment under the cantilever 2 at a safe distance of e.g. 10 mm.

In a sequence of approach steps, a three-dimensional "overview image" or map is generated. To effect this, the PED 4 takes a focal plane image, then advances vertically, actuated by the PED's driving system 5, by a small distance, e.g. 5 µm, towards the sample 1. Now the PED 4 takes the next focal plane image and advanced the next 5 µm towards the sample. Subsequent image acquisition is continued until e.g. 200 focal plane images are taken. These focal plane images are then processed to obtain a 3-D overall map. The size of the vertical steps, Sum in the example, is varied depending on the size of the sample 1 and may even vary from step to step depending on the images detected.

Independent of the employed PED and the mechanism used for obtaining the integral map of the object surface, the following lists the mathematical selection criteria for producing a map of test or "validated" areas or locations of a sample:

Given or obtained, resp., are the following measures and data:
  a PED or sample coordinate system with a raster of captured data, e.g. with 1 µm step width;
  sample coordinates are denominated x=0 ... K; y=0 ... L; $P_{xy}$;
  an SPM coordinate system with the same raster width as the PED/sample coordinate system, here with 1 µm step width;
  SPM coordinates are denominated $S_{mn}$, wherein $S_{m'n'}$ is the tip's coordinate (apex of the tip) with m=0 ... M, n=0 ... N and 0<m'<M, 0<n'<N.

The subsequent steps are used to "validate" a sample coordinate $P_{xy}$, "validate" meaning that a point of the sample is accessible by the tip of the SPM 3.

1. Calculate the distance $d_{mn}(x,y)$ from each SPM coordinate point $S_{mn}$ to the sample 1 for each respective sample coordinate $P_{xy}$.
$d_{mn}(x,y)=(S_{mn}-P_{(x+m)(y+n)})$, wherein m=0 ... M and n=0 ... N.

whereas e.g. $d_{mn}(x,y)$ measures the z-coordinate difference of the respective coordinates.

2. If min $d_{mn}(x,y)=d_{m'n'}(x,y)$, then the sample coordinate $P_{xy}$ is validated as good, i.e. $P_{xy}$ (val).

3. Repeat steps 1 and 2 above until all sample coordinates $P_{xy}$ are investigated. The hereby validated sample coordinates $P_{xy}$ (val) represent, i.e. define an area of interest for SPM measurements.

Knowing the validated sample coordinates $P_{xy}$ (val), an electronic control system (e.g. a computer) controls a move of the SPM 3 using the PED driving system 5 to the first location where a safe measurement, i.e. raster scanning, can be performed. "Safe" means that there is no danger that any part of the cantilever or scanning device except the cantilever tip may collide with the sample.

Since the vertical distance is known from the PED measurement described above, the coarse approach can be done at highest possible speed.

FIG. 5 indicates some parts of the sample surface as dotted lines. This is to indicate that these parts are inaccessible areas 6 by the raster scanning SPM in the shown orientation of the sample.

Figure 6:
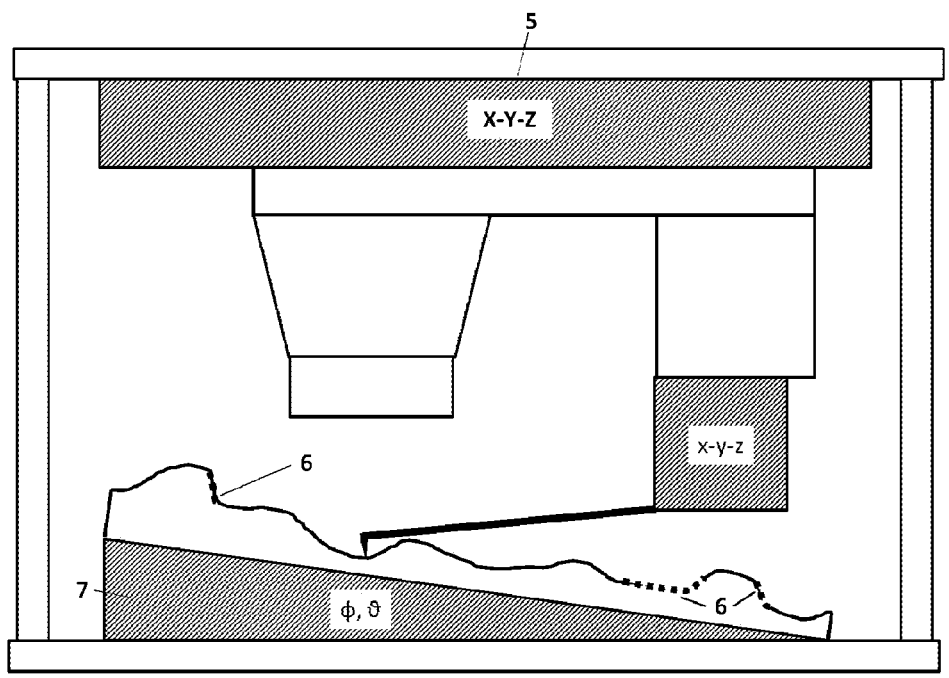
FIG. 6 is a further view of the third system according to the invention showing a sample tilting mechanism to enable access to hitherto inaccessible areas of the sample.

FIG. 6 shows the solution for this problem. It is an extension of the method described and allows to scan the hitherto inaccessible areas 6. To achieve this, the sample 1 is tilted from horizontal and adjusted by an actuator 7 in one or two directions or planes by an angle Φ and/or θ as shown in the figure. This tilting is limited by the design of the PED/SPM and will usually not exceed 60°. The thus tilted sample 1 allows the SPM to raster scan these otherwise inaccessible areas 6 of the sample 1.

Figure 7:
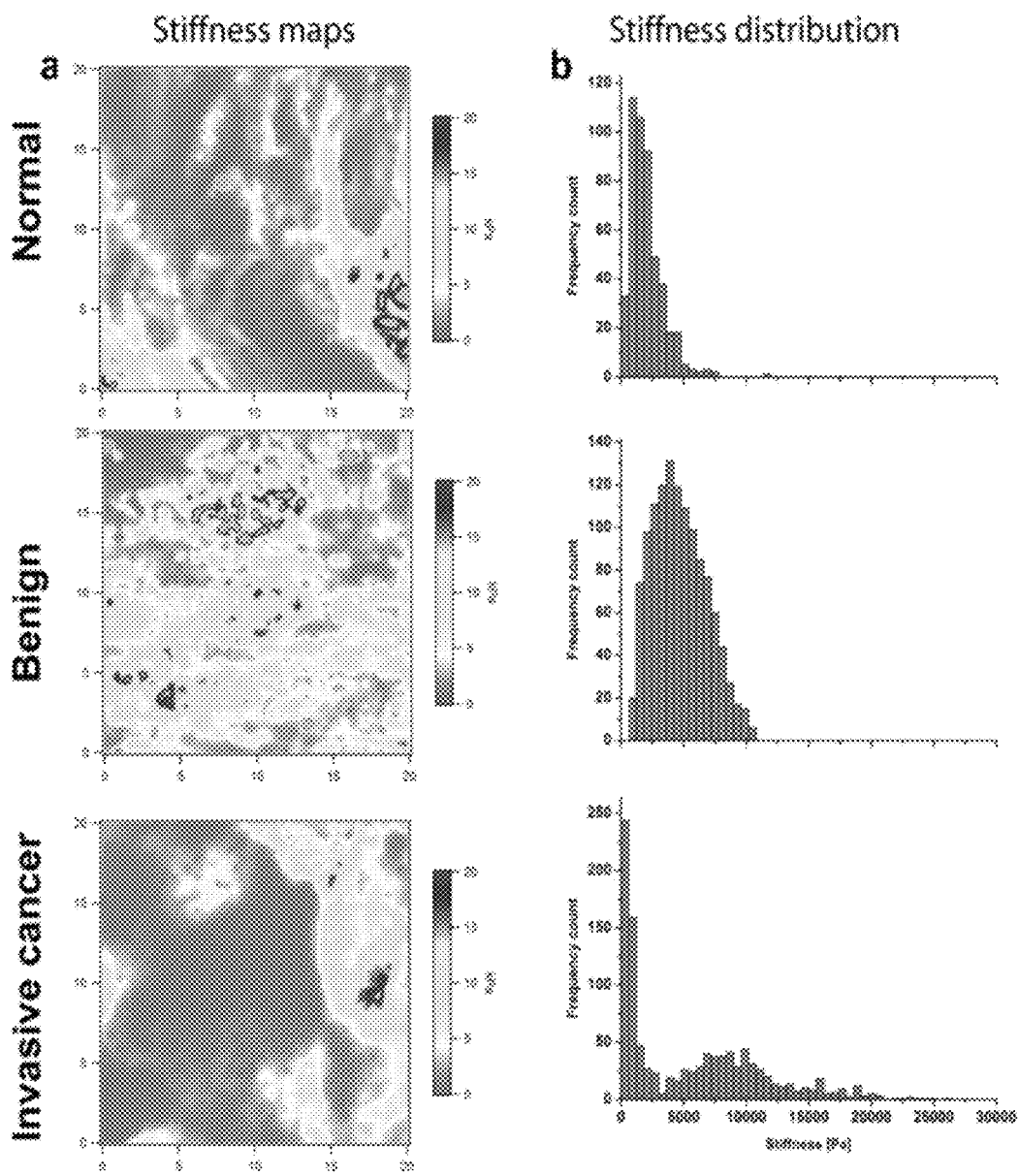
FIG. 7 shows sample results of tissues investigated by an automated system according to the invention.

FIG. 7 finally illustrates results of investigations carried out by the automatic method and apparatus according to the invention. A paper by Plodinec et al. "The nanomechanical signature of breast cancer" in Nature Nanotechnology 7 (2012) pp. 757-765) describes how tissue samples can be investigated and classified according to their stiffness distribution.

To obtain the desired stiffness distribution from a stiffness map as obtained by the raster scan of the SPM, statistic software such as "Origin Pro 8.5" is used, obtainable from OriginLab Corporation in Northampton, Mass. 01060, USA. A suitable bin width of 600 Pa is used in the example.

FIG. 7 shows the results of three different human/animal tissue samples studied. The three samples were checked for the probability of showing any malign abnormality, i.e. cancer. Investigations of this kind are often called "tissue micromechanics".

The three diagrams on the left of FIG. 7, labelled "a", are maps of the surface stiffness of the three tissue samples, obtained with an indentation-type AFM by the measurement method described above. The above cited paper by Plodinec et al. describes details. The greyscale on the right of each map "a" indicates the stiffness of the tissue shown in units of kPa, e.g. in an area of 20 μm×20 μm.

The three diagrams on the right of FIG. 7, labelled "b", show the stiffness distribution of the three samples, i.e. the frequency of occurrence of points/areas with the particular stiffness. Note that the ordinates range of the three stiffness distribution diagrams differ significantly.

The uppermost twin diagrams "a" and "b" show the distributions for a "normal" piece of tissue, i.e. one showing no abnormality.

The center two diagrams "a" and "b" represent the two distributions for a piece of tissue with a probably benign abnormality, here a benign neoplasm, i.e. a disease involving unregulated, but benign cell growth. Such benign neoplasm usually does not invade neighbouring tissues and thus does not spread through the human or animal body.

The lowermost diagram pair "a" and "b" in FIG. 7 represent the two distributions for a piece of tissue with a probably malign abnormality, i.e. a malign neoplasm, potentially invasive cancer. This disease involves unregulated cell growth which invades neighbouring tissues and spreads through the human or animal body.

It is obvious that the different stiffness distributions give a good indication of the quality of the investigated tissue. In particular the lowermost stiffness distribution with its much higher peak value of the frequency count—about twice the count of a normal tissue shown in the uppermost diagram pair—and its widely spread and uneven stiffness distribution—at least twice the stiffness spread of a normal tissue—indicates clearly the abnormality of the tested tissue, here an indication of its malignity.

It should be now clear that the present invention enables a mostly automated and hence quick and safe examination and analysis of tissue samples and samples of comparable structure with respect to their stiffness. Such a quick analysis is of particular advantage in medical or biological applications, where it provides a fast and reliable indication of a tissue's abnormality, e.g. malignity. Based on the above description, a person skilled in the art can easily vary the design and the functions described above and adapt them to other implementations without departing from the inventive gist as defined in the appended claims.

The invention claimed is:

1. A method for automatic raster scanning a surface of a sample using a mapping means for mapping said surface and a scanning means for raster scanning said surface, said scanning means performing force spectroscopy and said surface being substantially larger than the scanning area of said scanning means, said method comprising the following steps:
   automatically mapping the complete surface, or a large part of it by optical coherence or structured illumination or by an opto-acoustical system,
      thereby coarsely positioning said mapping means over said surface of said sample in a given distance,
      stepwise reducing said distance, thereby in each step recording a focal plane of said surface and
      from said recorded focal planes, developing an integral or total three-dimensional map of said surface including an elevation profile,
   automatically analysing said integral map or total three-dimensional map by a mathematical collision detection analysis to identify and localize at least one two-dimensional area of interest within said surface, thereby deriving the elevation of said area of interest,
   automatically positioning said raster scanning means over said area of interest at a distance given by the derived elevation, and
   thereafter automatically performing force spectroscopy in said area of interest of said surface by said raster scanning means.

2. The method according to claim 1, wherein the sample is tilted during the mapping step by an angle Φ and/or θ, said angle being determined in one or two directions or planes, up to about 60° degrees from horizontal in at least one plane to access otherwise inaccessible areas of interest of the surface of said sample.

3. The method according to claim 1, wherein the integral map or total three-dimensional map of the surface is provided in digital form.

4. The method according to claim 1, wherein the opto-acoustical system is a confocal photoacoustic microscopy system.

5. The method according to claim 1, wherein the mathematical collision detection analysis provides
an identification and localization of at least one two-dimensional area of interest within the surface and
a determination of the third dimension as elevation of said identified two-dimensional area of interest.

6. The method according to claim 1, wherein after the analysing step, the raster scanning means is positioned at a defined distance above the two-dimensional area of interest, said distance being defined or controlled by the elevation derived in the mapping step, and thereafter the raster scanning means performs force spectroscopy in said area of interest.

7. An apparatus for automatically scanning an object or sample being larger than the typical scanning area of a raster scanning means according to claim 1, comprising:
force spectroscopy raster scanning means,
mapping means for coarsely mapping said entire sample or a large part of it, said mapping means using one of an optical coherence or a structured illumination or an opto-acoustical method for producing an integral three-dimensional map of said sample,
analyzing means for analyzing said integral map by a mathematical collision detection analysis, said analyzing means identifying and localizing an area of interest within said integral map including the third dimension as elevation of said identified area of interest, and
control means for controllably directing said raster scanning means to said area of interest at a distance above said area of interest given by said third dimension to perform force spectroscopy in said area of interest.

8. The apparatus according to claim 7, wherein the mapping means is a confocal photoacoustic microscopy system generating ultrasonic waves.

9. The apparatus according to claim 7, further including a mathematical processor performing the mathematical collision detection method.

10. The apparatus according to claim 7, further including a coarse approach mechanism for positioning said raster scanning means close to the area of interest.

11. The apparatus according to claim 7, wherein the raster scanning means is a scanning probe microscope (SPM) using at least one of the following methods of force spectroscopy: force distance spectroscopy, indentation spectroscopy, friction force spectroscopy, magnetic force spectroscopy, force modulation spectroscopy, or friction force microscopy.

12. The method of claim 1, wherein the given distance is several mm.

13. The method of claim 12, wherein said distance is reduced by steps of a few μm.

14. The apparatus of claim 10, wherein the coarse approach mechanism is integrated into the raster scanning means.

* * * * *